US006911788B2

(12) United States Patent
Moon

(10) Patent No.: US 6,911,788 B2
(45) Date of Patent: Jun. 28, 2005

(54) ELECTRONIC BALLAST OF HIGH POWER FACTOR FOR COMPACT FLUORESCENT LAMP

(76) Inventor: Dai Sung Moon, 105-601 Donga 1-cha, Sindorim-dong, Guro-gu, Seoul (KR)

(*) Notice: Subject to any disclaimer, the term of this patent is extended or adjusted under 35 U.S.C. 154(b) by 16 days.

(21) Appl. No.: 10/602,741

(22) Filed: Jun. 25, 2003

(65) Prior Publication Data

US 2004/0104692 A1 Jun. 3, 2004

(30) Foreign Application Priority Data

Nov. 29, 2002 (KR) .............................. 20-2002-0035810
Dec. 30, 2002 (KR) .............................. 20-2002-0038985

(51) Int. Cl.[7] .............................................. H05B 41/16
(52) U.S. Cl. ................... 315/247; 315/118; 315/209 R; 315/291; 315/DIG. 7
(58) Field of Search .......................... 315/247, 209 R, 315/278, 291, 118, 103, 94, 223, 224, DIG. 7

(56) References Cited

U.S. PATENT DOCUMENTS

| | | | | |
|---|---|---|---|---|
| 4,417,181 A | * | 11/1983 | Leale ..................... | 315/209 R |
| 5,426,348 A | | 6/1995 | Qi | |
| 5,500,792 A | * | 3/1996 | Jeon et al. ................... | 363/98 |
| 5,635,799 A | * | 6/1997 | Hesterman .................. | 315/127 |
| 6,271,633 B1 | | 8/2001 | Shen et al. | |
| 6,281,641 B1 | | 8/2001 | Chen et al. | |
| 6,316,883 B1 | * | 11/2001 | Cho et al. ................... | 315/247 |
| 6,486,615 B2 | | 11/2002 | Hui et al. | |

* cited by examiner

Primary Examiner—Haissa Philogene
(74) Attorney, Agent, or Firm—Mayer, Brown, Rowe & Maw LLP

(57) ABSTRACT

Disclosed is an electronic ballast of a high power factor for a compact fluorescent lamp (CFL) capable of implementing a high power factor and turning on lamps of different capacitances (3W–26W), or selectively turning on two lamps having the same capacitance or one lamp, using one circuit, by separating a lamp power and a circuit driving power. The electronic ballast comprises a voltage divider for dividing a DC power inputted thereto into a lamp power and a circuit driving power, field effect transistors for controlling a voltage of the circuit driving power to provide it as a voltage for high frequency oscillation, a resistor and diodes for preventing a voltage higher than a predetermined voltage from being applied to the field effect transistors, Zenor diodes for making the voltage through the field effect transistors a constant voltage, a bulb for receiving a high frequency generated by oscillation coils through a choke coil to turn on the CF lamp, and diodes and condensers for removing a surge voltage occurring when the lamp is connected to the socket in order to protect the lamp and the socket.

5 Claims, 4 Drawing Sheets

ELECTRONIC BALLAST OF HIGH POWER FACTOR FOR COMPACT FLUORESCENT LAMP

BACKGROUND OF THE INVENTION

1. Field of the Invention

The present invention relates to an electronic ballast of a high power factor for a compact fluorescent lamp (CFL), and more particularly, to an electronic ballast of a high power factor for a compact fluorescent lamp (CFL) capable of implementing a high power factor and turning on lamps of different capacitances (3W–26W) or selectively turning on two lamps having the same capacitance or one lamp, using one circuit, by replacing a switching transistor with a field effect transistor and separating a lamp power and a circuit driving power.

2. Background of the Related Art

In general, lighting fixtures that emit light such as an incandescent light, a fluorescent lamp, and the like are attached to given locations (in particular, ceiling) in an office, homes, buildings, and the like, in order to make bright surrounding environment when it gets dark. Those lighting fixtures are replaced with new ones after their power are run out.

The fluorescent lamp of these lighting fixtures might be classified largely into a transformer mode and a ballast mode.

A compact fluorescent lamp (CFL) that has been widely used has a ballast element and a screw element on the top of the lamp. It can be thus easily used as a socket for a common incandescent light.

The lamp socket of a socket type for use in the incandescent light, the fluorescent lamp, etc. has been widely used for interior illumination in common homes, offices, etc. or inner illumination within refrigerators, microwave ovens, etc.

However, the above lamp is expensive since respective lamps have ballasts installed thereto. Further, this kind of the lamp has problems that resources are unnecessarily wasted and environment is contaminated since the lamp its power is run out must be discarded.

Further, if a lamp having no ballast is to be used, a transformer or an electronic ballast in addition to a socket must be provided. However, the volume of the transformer or the electronic ballast is large. Due to this, there is a problem that the productivity is low since they are difficult to install within the lamp.

In order to solve the mentioned problems encountered in the conventional compact fluorescent lamp, there was proposed a ballast socket for the compact lamp in which a printed circuit board integrated with various circuit components is mounted within the socket in order to improve the productivity.

FIG. 1 is a circuit diagram of the conventional electronic ballast for the compact fluorescent lamp according to one embodiment of a prior art.

As shown in FIG. 1, a photocell circuit unit 100 includes a power supply unit 101 for supplying a power, a varistor B1 connected between both ends of the power supply unit 101 for stabilizing an AC (alternating current) power inputted thereto, a fuse F1 that is short-circuited in order to prevent in advance damage of the circuit due to a high voltage when an AC power inputted thereto exceeds a predetermined voltage, a DC transformer 103 for rectifying the AC power outputted from the power supply unit 101 and then outputting it as a DC power, a photoelectric device PC connected to the DC transformer 103, for transforming the output voltage of the DC transformer 103 as a resistance value of the photoelectric device PC becomes low when the photoelectric device is exposed to bright environment and a resistance value of which becomes high when the photoelectric device is exposed to dark environment, first and second amplifiers 105 and 107 connected to the photoelectric device PC, for comparing the reference voltage and a voltage changed depending on an internal resistance value of the photoelectric device PC and then amplifying the difference voltage, a thyristor (SCR) 109 connected to the first and second amplifiers 105 and 107, for switching the voltage outputted from the first and second amplifiers 105 and 107, a bridge diode (BD) 111 connected to the thyristor 109, for rectifying the voltage outputted from the thyristor 109, and a triac TA1 connected to the bridge diode 111, for supplying the power to a DC transformation unit 200 or blocking the power applied to the DC transformation unit 200.

A DC transformation unit 200 includes a bridge diode (BD) and smoothing condensers C5 and C6 for rectifying the AC power supplied from the photocell circuit unit 100 to be a DC power.

Further, a CF lamp driving circuit unit 300 includes power transistors T1 and T2 connected to the bridge diode (BD) and the smoothing condensers C5 and C6 in the DC transformation unit 200, for turning on the CF lamp, oscillation coils L1, L2 and L3 connected to the power transistors T1 and T2, for generating a frequency of 25 Khz~30 Khz depending on the values of the coils, a bulb BULB connected to the oscillation coils L1, L2 and L3, for turning on the CF lamp using a voltage of a high frequency, a condenser C10 connected between the oscillation coil L3 and the bulb BULB, for offsetting a surge voltage occurring when the lamp is connected to the socket in order to protect the lamp and the socket, and a thermistor switch 301 for sensing the temperature within the socket and then putting out the lamp when the sensed temperature is higher than the reference temperature.

In the above, the CF lamp driving circuit unit 300 further includes a plurality of diodes D5, D6, D7, D8 and D9 for protecting the power transistors T1 and T2, and a triac TA2 for preventing line surge from being applied to the base of the power transistor T2.

An operation of the conventional electronic ballast for the compact fluorescent lamp constructed above will be below described.

First, the photocell circuit unit 100 receives an AC power for common use (AC120V~AC220V) and then determines whether the photoelectric device PC has to be turned on depending on the intensity of surrounding radiation. If it is determined that the photoelectric device PC has to be turned on, the bridge diode (BD) and the smoothing condensers C5 and C6 in the DC transformation unit 200 convert the AC power into a DC power. The power transistors T1 and T2 in the CF lamp driving circuit unit 300 are repeatedly turned on and off according to the DC power. Accordingly, the oscillation coils L1, L2 and L3 cause high-frequency oscillation, so that the lamp is turned on by the high frequency generated thus.

Meanwhile, if surrounding environment of the photocell circuit unit 100 is bright, the power applied to the DC transformation unit 200 or the CF lamp driving circuit unit 300 is blocked, so that the lamp is not turned on. If surrounding environment of the photocell circuit unit 100 is dark, the photoelectric device PC turns on the triac TA1 being a switching device.

At this time, if surrounding environment is dark than about 10LUX~30LUX, the resistance value of the photoelectric device PC becomes high. Also, the photoelectric device PC inputs a voltage higher than the reference voltage to the first and second amplifiers P1 and P2 in the first and second amplifiers 105 and 107.

Next, the first and second amplifiers P1 and P2 compare the voltage with the reference voltage and then amplify the difference voltage by a given level to output the resulting voltage to the gate of the thyristor (SCR) 109. At this time, the condenser C2 of the second amplifier P2 plays an important role in preventing that the lamp is put out when surrounding environment becomes instantly bright while the lamp is turned on.

Further, the thyristor 109 performs a switching operation according to the voltage applied to the gate thereof and thus controls the operation of the bridge diode 111.

In addition, the DC transformer 103 in the photocell circuit unit 100 receives the power outputted from the power supply unit 101, makes smooth the voltage as a DC power, and then supplies the resulting power to the first and second amplifiers 105 and 107 and other circuits.

Meanwhile, the AC power applied to the DC transformation unit 200 is rectified as a DC power by means of the bridge diode BD and the smoothing condensers C5 and C6.

Further, the DC transformation unit 200 outputs the voltage that was rectified as the DC power, to the power transistors T1 and T2 through the resistor R11, the diode D5, the condenser C7 and the triac TA2 in the CF lamp driving circuit unit 300.

At this time, the power transistors T1 and T2 are alternately driven each other.

In particular, the power transistors T1 and T2 oscillate in a frequency of 25 Khz~30 Khz depending on the values of the oscillation coils L1, L2 and L3 connected to the bases of the power transistors T1 and T2. These oscillation voltages result in supplying an instantly high voltage through the coil (CT) and the condenser C9 of the bulb BULB, to both ends of the lamp.

Therefore, the lamp is turned on while a gas is ionized within the lamp.

Further, the condenser C10 connected between the oscillation coil L3 and the bulb BULB offsets the surge voltage occurring when the lamp is connected to the socket, whereby flickering of the lamp is removed.

Also, the thermistor switch 301 senses the temperature within the socket and blocking the power being applied to the CF lamp driving circuit unit 300 when the sensed temperature is higher than the predetermined temperature, thus putting out the lamp.

FIG. 2 is a circuit diagram of a conventional electronic ballast for 120V according to the other embodiment of the prior art.

As shown in FIG. 2, the electronic ballast includes the power supply 601; a power supply unit 610 having a fuse F that is short-circuited in order to prevent in advance damage of the circuit due to a high power when the voltage of the power supply 601 exceeds a predetermined voltage, a varistor B1 connected between both supply ends of the power supply 601 for stabilizing an AC power, a filter 611 for removing noise from the power, and a plurality of condensers C1~C3 for voltage stabilization; a DC transformation and boosting unit 700 having diodes D12 and D13 and condensers C13 and C14 for rectifying the AC power (120V) supplied from the power supply unit 610 to be a DC power and then boosting it twice; and a lamp driving unit 300 that oscillates according to the power supplied from the DC transformation and boosting unit 700 to turn on the lamp.

In the above, the lamp driving unit 300 includes power transistors Q1 and Q2 connected to the DC transformation and boosting unit 700, for performing a switching operation in order to produce an oscillation voltage for turning on the fluorescent lamp, oscillation coils L1, L2 and L3 connected to the power transistors Q1 and Q2, for generating a frequency of 25 Khz~30 Khz depending on the values of the coils, a bulb BULB connected to the oscillation coils L1, L2 and L3, for turning on the fluorescent lamp using a voltage of a high frequency, diodes D10 and D11 and condensers C10 and C11, which are connected between the oscillation coil L3 and the bulb BULB, for offsetting a surge voltage occurring when the lamp is connected to the socket in order to protect the lamp and the socket, a plurality of diodes D5~D9 for protecting the power transistors Q1 and Q2, and a triac TA1 for preventing line surge applied to the base of the power transistor Q2.

An exemplary operation of the fluorescent lamp for the electronic ballast constructed above will be below described.

AC 120V of the power supply 601 is inputted to the power supply unit 610. In the power supply unit 610, the filter 611 filters the AC power through the fuse F to remove line noise from the AC power. Next, the plurality of the condensers C1~C3 stabilize the AC power and then transmit the stabilized AC power to the DC transformation and boosting unit 700.

In the DC transformation and boosting unit 700, the diodes D12 and D13 rectify the AC power to be a DC power. Next, the condensers C13 and C14 boost the DC power twice and then transfer it to the lamp driving unit 300.

In the lamp driving unit 300, the power transistors Q1 and Q2 are repeatedly turned on and turned off according to the DC power. Accordingly, high frequency oscillation occurs through the oscillation coils L1, L2 and L3, which turns on the lamp.

In other words, the DC power that was boosted to the DC power twice in the DC transformation and boosting unit 700 is transferred to the power transistors Q1 and Q2 via the resistor R11, the diode D5, the condenser C7 and the triac TA1. Also, the power transistors Q1 and Q2 are alternately operated according to the DC power.

In particular, the power transistors Q1 and Q2 oscillate in a frequency of 25 Khz~30 Khz depending on the values of the oscillation coils L1, L2 and L3 connected to the bases of the power transistors Q1 and Q2. This oscillation voltage results in supplying an instantly high voltage through the coil CT and the condenser C9 of the bulb BULB, to both ends of the lamp. Therefore, the lamp is turned on while a gas within the lamp is ionized.

Further, the diodes D10 and D11 and the condensers C10 and C11, which are connected between the oscillation coil L3 and the bulb BULB, offset the surge voltage occurring when the lamp is connected to the socket, whereby flickering of the lamp is removed.

In the first and second embodiments, however, the power supply of the circuit that oscillates at high frequency to drive the lamp and the lamp power supply for turning on the lamp is utilized as single power supply. Due to this, the first and second embodiments have disadvantages that the power factor is low and the overall operation of the circuit is unstable due to interference, etc.

Also, the second embodiment has disadvantages that only one lamp could be turned on and additional circuit for emitting heat is not designed.

SUMMARY OF THE INVENTION

Accordingly, the present invention is directed to a ~ that substantially obviates one or more problems due to limitations and disadvantages of the related art.

An object of the present invention is to provide an electronic ballast of a high power factor for a compact fluorescent lamp (CFL) capable of implementing a high power factor and turning on lamps of different capacitances (3W–26W) or selectively turning on two lamps having the same capacitance or one lamp, using one circuit, by replacing a switching transistor with a field effect transistor (FET) and separating a lamp power and a circuit driving power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electronic ballast having a photocell circuit unit, a DC transformation unit and a CF lamp driving circuit unit according to a first embodiment of the present invention is characterized in that the CF lamp driving circuit unit comprises:

a voltage divider for dividing a DC power supplied from the DC transformation unit into a lamp power and a circuit driving power;

field effect transistors for controlling a voltage of the circuit driving power supplied from the voltage divider to provide it as a voltage for high frequency oscillation;

a resistor and diodes provided at the front stage of the field effect transistors, for preventing a voltage higher than a predetermined voltage from being applied to the field effect transistors;

a triac for preventing line surge from being applied to the gates of the field effect transistors;

Zenor diodes for making the voltage through the field effect transistors a constant voltage;

a plurality of oscillation coils that oscillate at high frequency according to the constant voltage produced by the Zener diodes to generate a high frequency;

a bulb for receiving the high frequency generated by the oscillation coils through a choke coil to turn on the CF lamp; and diodes and condensers connected to one side of the bulb, for removing a surge voltage occurring when the lamp is connected to the socket in order to protect the lamp and the socket.

In the above, the voltage divider comprises a first diode and a first condenser connected to the output terminal of the DC transformation unit, for supplying the circuit driving power, and a second diode and a second condenser connected to the output terminal of the DC transformation unit, for preventing the lamp power from being introduced to the driving circuit side.

An electronic ballast having a power supply, a power supply unit and a DC transformation and boosting unit according to a second embodiment of the present invention is characterized in that it comprises:

a lamp driving unit that oscillates according to a power supplied from the DC transformation and boosting unit to selectively turn on a plurality of lamps (fluorescent lamp, CF lamp); and anti-overheating unit for instantly bypassing a high voltage when the lamp is turned on by a lamp driving unit in order to prevent over-heating of a bulb.

In the above, the lamp driving unit comprises:

field effect transistors for controlling the voltage supplied from the DC transformation and boosting unit to supply the voltage for high frequency oscillation;

resistors and diodes provided at the front stage of the field effect transistors, for preventing a voltage higher than a predetermined voltage from being applied to the field effect transistors;

Zener diodes for making the voltage through the field effect transistors a constant voltage;

a plurality of oscillation coils that oscillate at high frequency according to the constant voltage from the Zener diodes to generate a high frequency;

a plurality of bulbs for using the high frequency from the oscillation coils through choke coils to selectively turn on a plurality of lamps (fluorescent lamp, CF lamp, etc.); and a plurality of diodes and condensers, which are connected between the oscillation coil and the plurality of the bulbs, for offsetting a surge voltage occurring when the lamp is connected to the socket in order to protect the lamp and the socket.

Further, the anti-overheating unit comprises an inductance and a condenser that instantly amplify the voltage and current to bypass the voltage and current to the rear stage, when the lamp is turned on.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
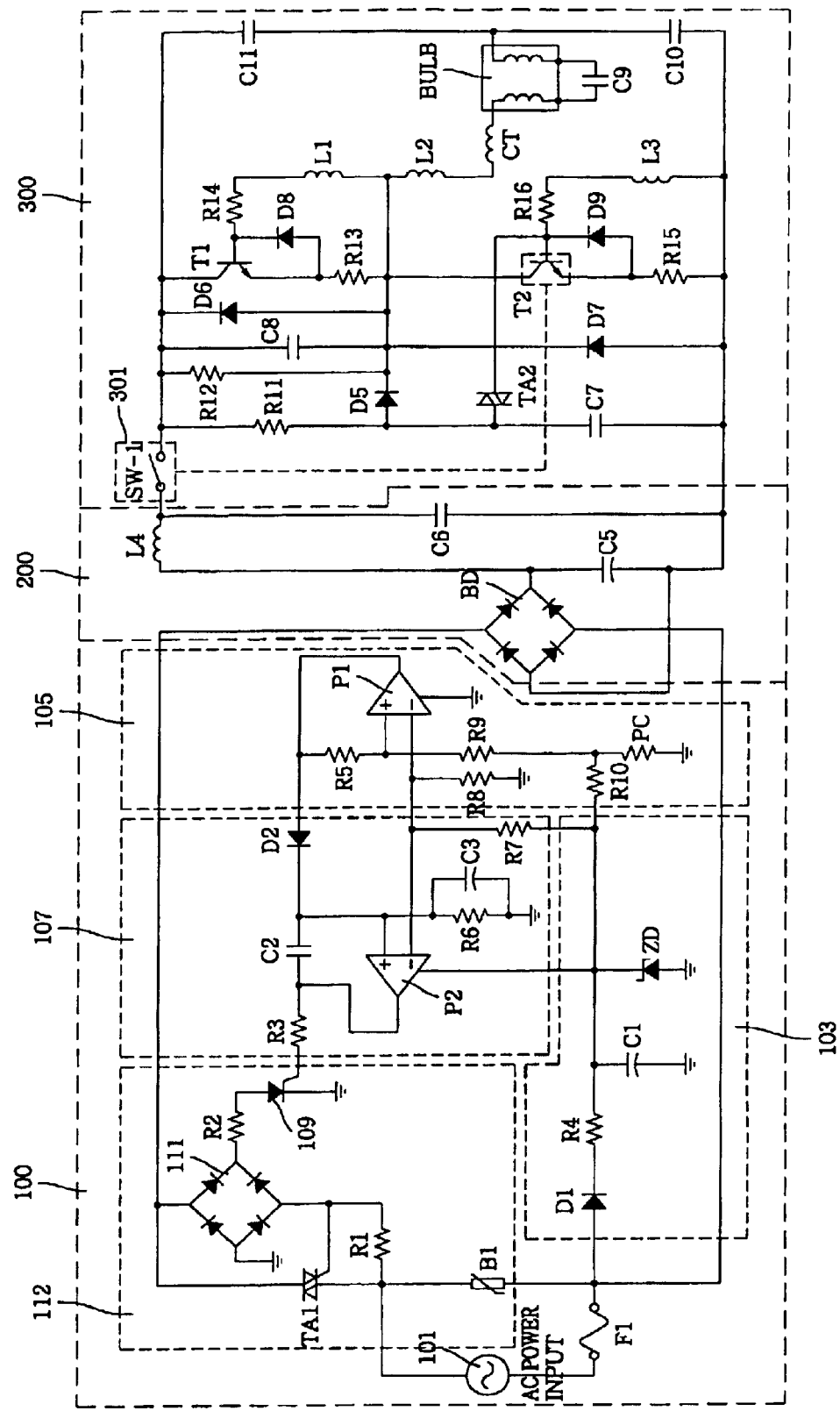
FIG. 1 is a circuit diagram of a conventional electronic ballast for a compact fluorescent lamp according to a first embodiment of a prior art.

The present invention will now be described in detail in connection with preferred embodiments with reference to the accompanying drawings. For reference, like reference characters designate corresponding parts throughout several views.

Figure 3:
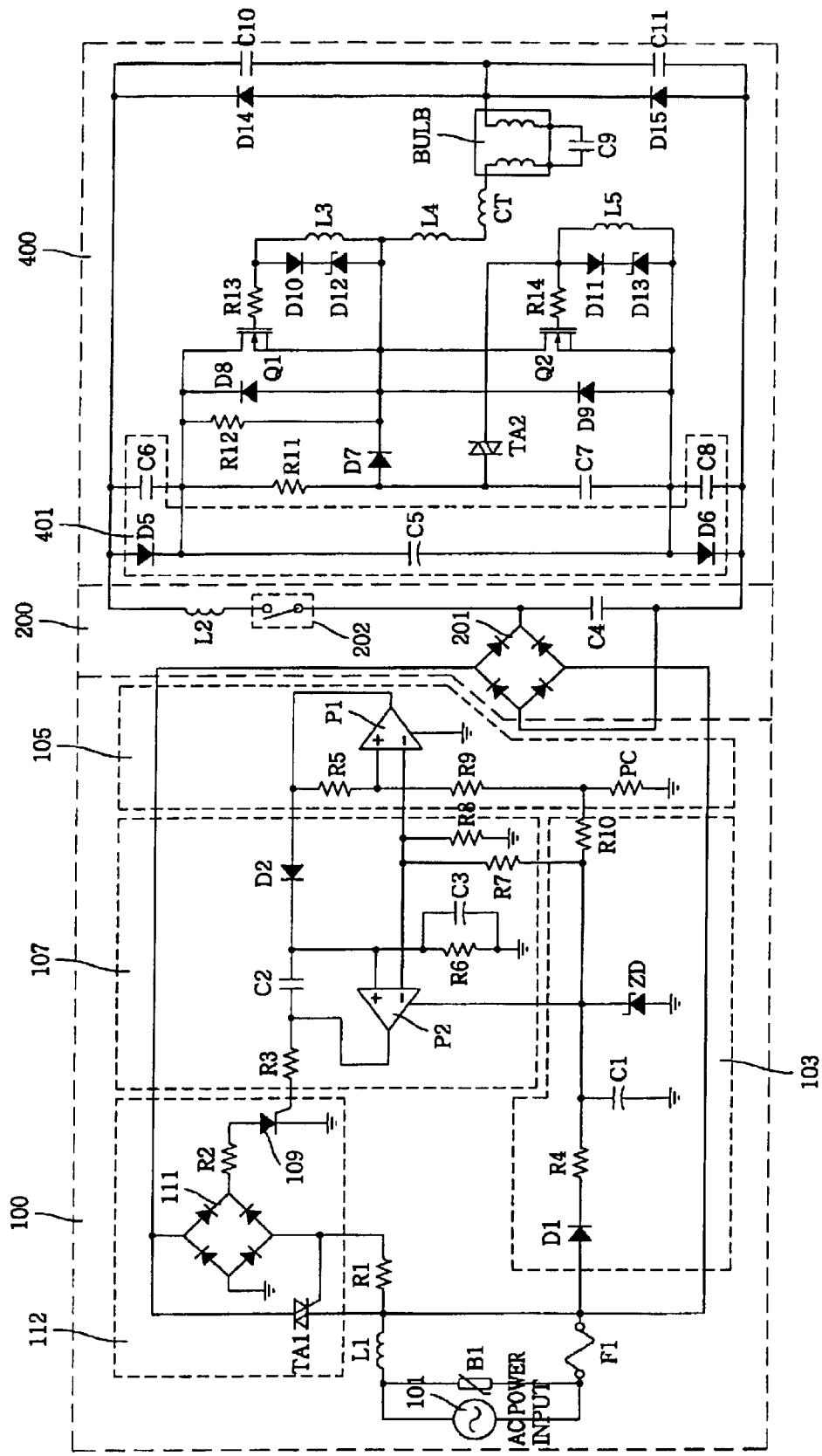
FIG. 3 is a circuit diagram of an electronic ballast of a high power factor for a compact fluorescent lamp (CFL) according to a first embodiment of the present invention.

FIG. 3 is a circuit diagram of an electronic ballast of a high power factor for a compact fluorescent lamp (CFL) according to a first embodiment of the present invention.

As shown in FIG. 3, a photocell circuit unit 100 comprises a power supply unit 101 for supplying an AC power, a varistor B1 connected between both ends of the power supply unit 101 for stabilizing an AC power inputted thereto, a fuse F1 that is short-circuited in order to prevent in advance damage of the circuit due to a high voltage when an AC power inputted thereto exceeds a predetermined voltage, a DC transformer 103 for rectifying the AC power from the power supply unit 101 and then outputting it as a DC power, a photoelectric device PC connected to the DC transformer 103, for using variation in its resistance value, depending on the intensity of radiation in surrounding environment, to transform the output voltage of the DC transformer 103, first and second amplifiers 105 and 107 connected to the photoelectric device PC, for comparing the reference voltage and a voltage varied depending on its internal resistance value and then amplifying the difference voltage, a thyristor (SCR) 109 connected to the first and second amplifiers 105 and 107, for performing a switching operation depending on the voltage outputted from the first and second amplifiers 105 and 107, a bridge diode (BD) 111 for rectifying the AC power to be a DC power when the thyristor 109 is turned on, and a triac TA1 connected to the bridge diode 111, for supplying the DC power to the rear stage only when the bridge diode 111 is driven.

A DC transformation unit 200 comprises a bridge diode 201 and a smoothing condenser C4 for full-wave rectifying the AC power supplied from the photocell circuit unit 100 to make the AC power a DC power, a thermistor switch 202 for sensing the temperature within the socket and blocking the power applied to a CR lamp driver 400 when the sensed temperature exceeds a predetermined temperature, and an inductance L2.

Figure 2:
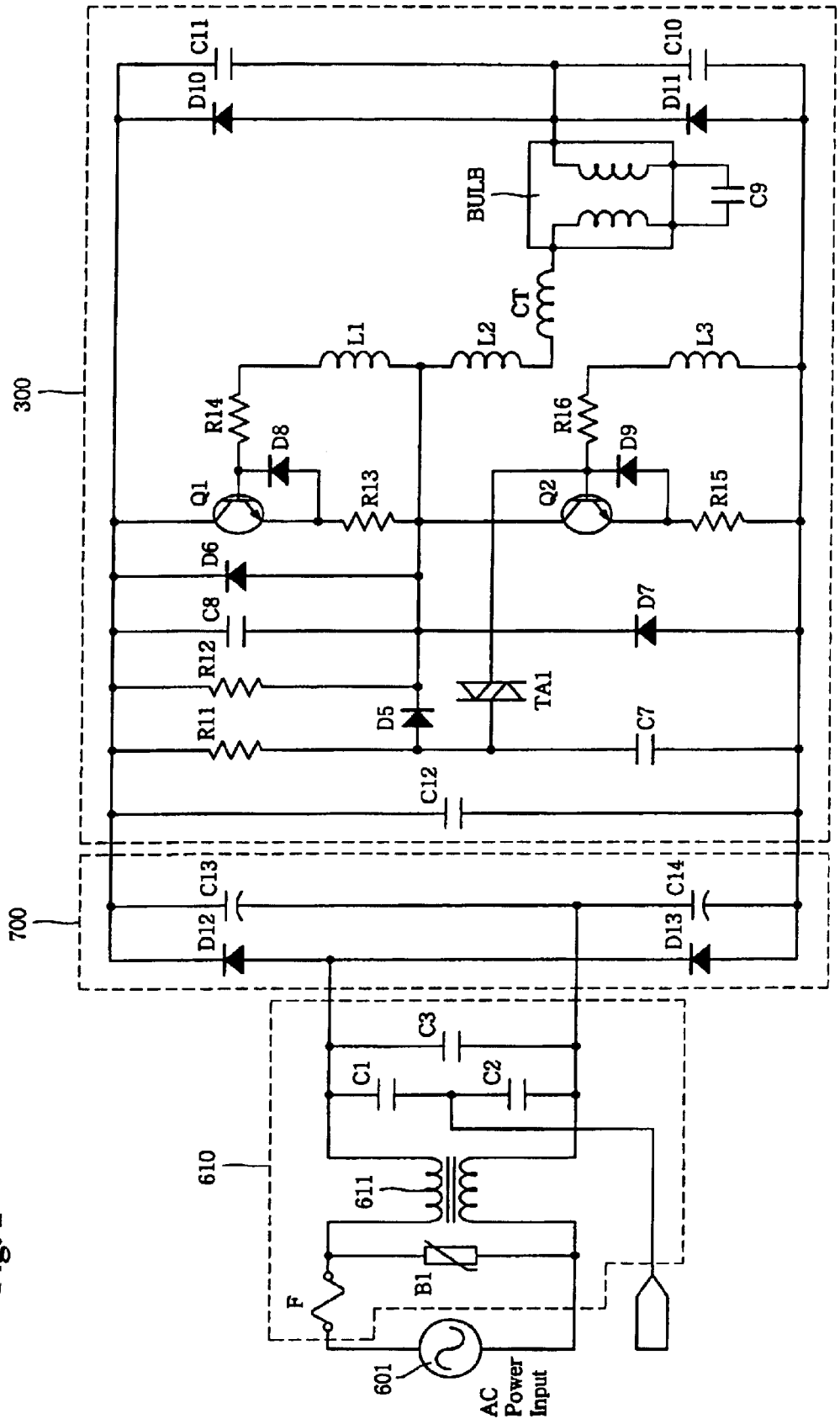
FIG. 2 is a circuit diagram of a conventional electronic ballast for a compact fluorescent lamp according to a second embodiment of a prior art.

In the above, the thermistor switch 202 is included in the CF lamp driving circuit unit 300 in the prior art (see FIG. 2). In the present invention, however, the thermistor switch 202 is included in the DC transformation unit 200. This is because it does not affect the operation of the circuit even though the thermistor switch 202 is included in any element. This depends on a designer's choice.

Further, the CF lamp driving circuit unit 400 comprises a voltage divider 401 for dividing the DC power supplied from the DC transformation unit 200 into a lamp power and a circuit driving power, field effect transistors Q1 and Q2 for controlling a voltage of the circuit driving power supplied from the voltage divider 401 to provide it as a voltage for high frequency oscillation, a resistor R12 and diodes D7, D8 and D9 provided at the front stage of the field effect transistors Q1 and Q2, for preventing a voltage higher than a predetermined voltage from being applied to the field effect transistors Q1 and Q2, a triac TA2 for preventing line surge from being applied to the gates of the field effect transistors Q1 and Q2, Zenor diodes D12 and D13 for making the voltage through the field effect transistors Q1 and Q2 a constant voltage, a plurality of oscillation coils L3~L5 that oscillate at high frequency according to the constant voltage produced by the Zener diodes D12 and D13 to generate a high frequency (25 Khz~30 Khz), a bulb BULB for receiving the high frequency generated by the oscillation coils L3 and L4 through a choke coil CT to turn on the CF lamp, and diodes D14 and D15 and condensers C10 and C11 connected to one side of the bulb BULB, for removing a surge voltage occurring when the lamp is connected to the socket in order to protect the lamp and the socket.

An operation of the electronic ballast of a high power factor for the compact fluorescent lamp (CFL) according to the first embodiment of the present invention will be below described.

As in the prior art, the photocell circuit unit 100 receives an AC power for common use (AC120V~AC220V) and then determines whether the photoelectric device PC has to be turned on depending on the intensity of surrounding radiation.

If surrounding environment of the photocell circuit unit 100 is bright, the power being applied to the DC transformation unit 200 or the CF lamp driving circuit unit 400 is blocked, so that the lamp is not turned on. On the contrary, if surrounding environment of the photocell circuit unit 100 is dark, the photoelectric device PC turns on the triac TA1 being a switching device.

At this time, if surrounding environment is dark than about 10LUX~30LUX, a resistance value within the photoelectric device PC becomes high. Also, the photoelectric device PC applies a voltage higher than the reference voltage to the first and second amplifiers P1 and P2 in the first and second amplifiers 105 and 107.

Next, the first and second amplifiers P1 and P2 compare the reference voltage and the inputted voltage and then amplify the difference voltage by a given level to output the resulting voltage to the gate of the thyristor (SCR) 109. At this time, the condenser C2 of the second amplifier P2 plays an important role in preventing that the lamp is put out when surrounding environment becomes instantly bright while the lamp is turned on.

Further, the thyristor 109 performs a switching operation according to the voltage applied to the gate thereof and thus controls the operation of the bridge diode 111. In other words, if the bridge diode 111 operates, the operating power is applied to the gate of the triac TA1 at the front stage. Thereby, the triac TA1 operates to supply the AC power to the DC transformation unit 200 at the rear stage.

On the contrary, if the bridge diode 111 does not operate, the operating power is not applied to the gate of the triac TA1. Accordingly, the triac TA1 is turned off and the AC power is thus not applied to the DC transformation unit 200 at the rear stage.

Further, the DC transformer 103 in the photocell circuit unit 100 makes smooth the power outputted from the power supply unit 101 as a DC power and then supplies the resulting DC power to the first and second amplifiers 105 and 107 and other circuits.

Meanwhile, the DC transformation unit 200 uses the bridge diode 201 to full-wave rectify the inputted AC power. Next, the DC transformation unit 200d uses the smoothing condenser C4 to make smooth the AC power and then converts it into a DC power. Thereafter, the DC transformation unit 200 supplies the DC power to the CF lamp driving circuit unit 400 via the thermistor switch 202 and the inductance L2.

At this time, the thermistor switch 202 detects the temperature within the socket into which the lamp is inserted. As a result of the detection, if the detected temperature exceeds a predetermined temperature (105°), the thermistor switch 202 is automatically shut down. Thereby, supply of the power to the CR lamp driver 400 is blocked to prevent damage of the circuit due to a high heat.

In the CF lamp driving circuit unit 400, the voltage divider 401 divides the DC power supplied from the DC transformation unit 200 into a lamp power and a circuit driving power, so that a high power factor can be implemented.

In the above, the voltage divider 401 comprises a first diode D5 and a first condenser C6 connected to the output terminal of the DC transformation unit 200, for supplying the circuit driving power, and a second diode D6 and a second condenser C8 connected to the output terminal of the DC transformation unit 200, for preventing the lamp power from being introduced to the driving circuit side.

The voltage divider 401 constructed above applies the DC power supplied from the DC transformation unit 200 to the driving circuit side through the first diode D5 and the first condenser C6. The operating power supplied thus is applied to the drain of the field effect transistor Q1. At this time, the resistor R12 and the diode D8 serves to prevent that the voltage applied to the field effect transistor Q1 exceeds a given value, thereby preventing the field effect transistor Q1 from being damaged.

Further, the operating power is transmitted to the gate of the field effect transistor Q1 via the diode D7 to control the operation of the field effect transistor Q1. Also, the operating power through the condenser C7 is transmitted to the gate of the field effect transistor Q2 to control the operation of the field effect transistor Q2.

At this time, the two field effect transistors Q1 and Q2 are alternately turned on and off. In other words, if the field effect transistor Q1 at one side is turned on, the field effect transistor Q2 at the other side is turned off. On the contrary, if the field effect transistor Q1 at one side is turned off, the field effect transistor Q2 at the other side is turned on.

Next, the oscillation coils L3, L4 and L5 connected to the sources of the field effect transistors Q1 and Q2 oscillate in a frequency of 25 Khz~30 Khz to generate a high voltage. The high voltage generated thus is applied to the bulb BULB via the choke coil CT.

The bulb BULB applies an instantly high voltage to the both ends of the lamp, which turns on the lamp while a gas within the lamp is ionized.

At this time, the diodes D14 and D15 and the condensers C10 and C11 remove a surge voltage occurring when the lamp is connected to the socket, whereby flickering of the lamp is removed.

Figure 4:
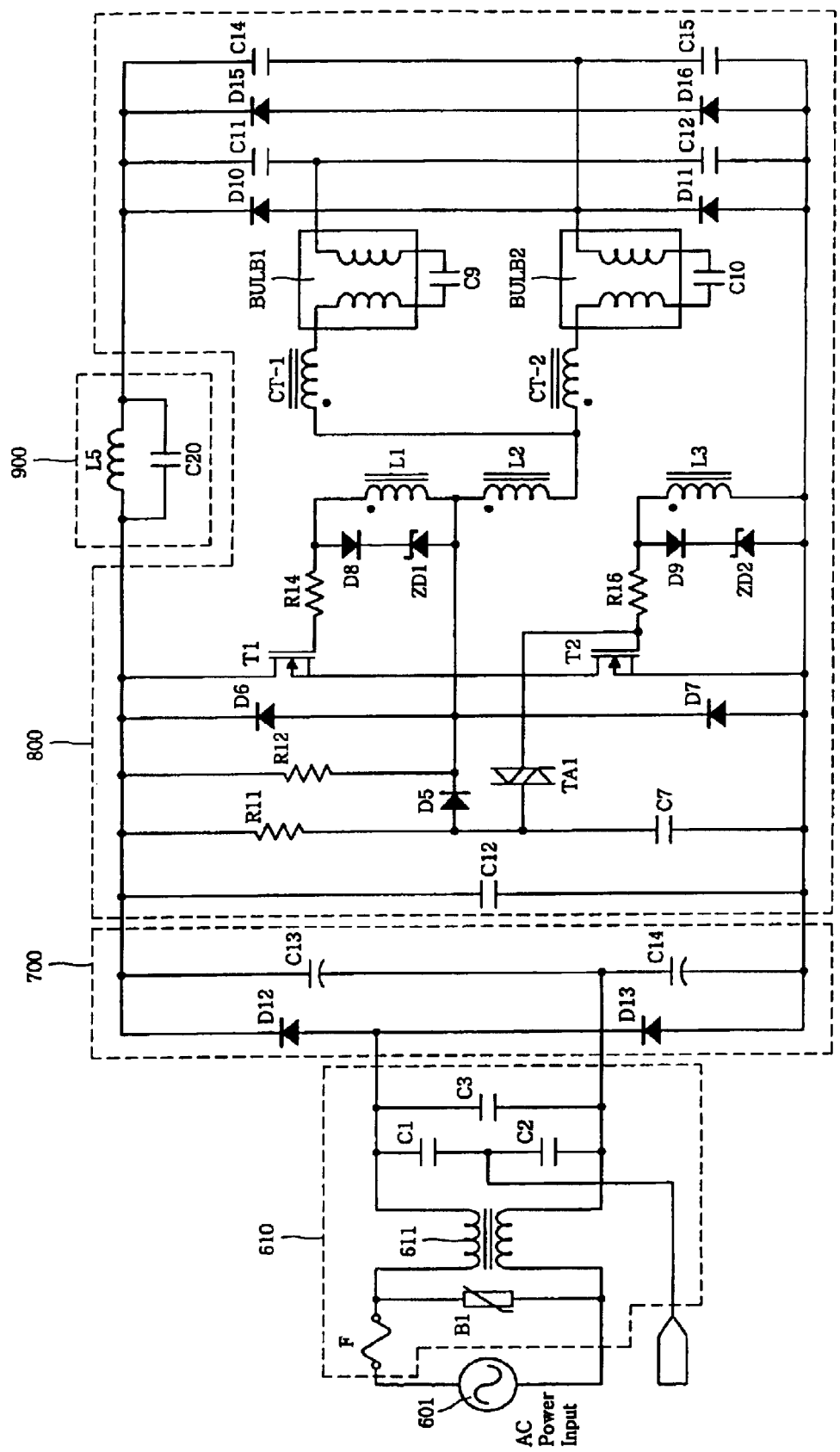
FIG. 4 is a circuit diagram of an electronic ballast of a high power factor for a compact fluorescent lamp (CFL) according to a second embodiment of the present invention.

FIG. 4 is a circuit diagram of an electronic ballast of a high power factor for a compact fluorescent lamp (CFL) according to a second embodiment of the present invention.

As shown in FIG. 4, the electronic ballast comprises a power supply 601; a power supply unit 610 having a fuse F that is short-circuited in order to prevent in advance damage of the circuit due to a high voltage when the voltage of the power supply 601 exceeds a predetermined voltage, a varistor B1 connected between both supply ends of the power supply 601 for stabilizing an AC power, a filter 611 for removing noise from the power, and a plurality of condensers C1~C3 for voltage stabilization; a DC transformation and boosting unit 700 having diodes D12 and D13 and condensers C13 and C14 for rectifying the AC power (120V) from the power supply unit 610 to be a DC power and then boosting the resulting DC power twice; a lamp driving unit 800 that oscillates according to the power supplied from the DC transformation and boosting unit 700 to selectively turn on a plurality of lamps (fluorescent lamp, CF lamp, etc.); and anti-overheating unit 900 for instantly bypassing the high voltage when the lamp is turned on by the lamp driving unit 800 in order to prevent over-heating of the bulb.

In the above, the lamp driving unit 800 comprises field effect transistors T1 and T2 for controlling the voltage supplied from the DC transformation and boosting unit 700 to supply the voltage for high frequency oscillation; resistors R11 and R12 and diodes D5~D7 provided at the front stage of the field effect transistors T1 and T2, for preventing a voltage higher than a predetermined voltage from being applied to the field effect transistors T1 and T2; Zener diodes ZD1 and ZD2 for making the voltage through the field effect transistors T1 and T2 a constant voltage; a plurality of oscillation coils L1~L3 that oscillate at high frequency according to the constant voltage from the Zener diodes ZD1 and ZD2 to generate a high frequency; a plurality of bulbs BULB1 and BULB2 for using the high frequency from the oscillation coils L1~L2 through choke coils CT1 and CT2 to selectively turn on a plurality of lamps (fluorescent lamp, CF lamp, etc.); and a plurality of diodes D10, D11, D15 and D16 and condensers C11, C12, C14 and C15 connected between the oscillation coil L2 and the plurality of the bulbs BULB1 and BULB2, for offsetting a surge voltage occurring when the lamp is connected to the socket in order to protect the lamp and the socket.

Further, the anti-overheating unit 900 comprises an inductance L5 and a condenser C20 that instantly amplify the voltage and current to bypass the voltage and current to the rear stage, when the lamp is turned on.

An operation of the electronic ballast of a high power factor for the compact fluorescent lamp (CFL) according to the second embodiment of the present invention will be below described.

AC 120V of the power supply 601 is inputted to the power supply unit 610. In the power supply unit 610, the filter 611 filters the AC power through the fuse F to remove line noise from the AC power. Next, the plurality of the condensers C1~C3 stabilize the AC power and then transmit the stabilized AC power to the DC transformation and boosting unit 700.

In the DC transformation and boosting unit 700, the diodes D12 and D13 rectify the AC power as a DC power. Next, the condensers C13 and C14 boost the DC power twice and then transfer it to the lamp driving unit 800.

In the lamp driving unit 800, the field effect transistors T1 and T2 are repeatedly turned on and off according to the DC power. Accordingly, high-frequency oscillation occurs through the oscillation coils L1, L2 and L3, which then turns on the lamp.

In other words, the DC power that was boosted to the DC power twice in the DC transformation and boosting unit 700 is transferred to the field effect transistors T1 and T2 via the resistor R11, the diode D5, the condenser C7 and the triac TA1. Also, the field effect transistors T1 and T2 are alternately driven according to the DC power.

In particular, the field effect transistors T1 and T2 oscillate in a frequency of 25 Khz~30 Khz depending on the values of the oscillation coils L1, L2 and L3 connected to the bases of the field effect transistors T1 and T2. This oscillation voltage results in supplying an instantly high voltage through the choke coils CT1 and CT2 and the condensers C9 and C10 in the bulbs BULB1 and BULB2 to both ends of the lamp. Therefore, the lamp is turned on while a gas within the lamp is ionized.

In other words, in the prior art, one stabilizer turns on only one fluorescent lamp. In the present invention, however, one stabilizer can selectively turn on a plurality of lamps having the same capacitance (i.e., one lamp is turned on, or plural lamps are turned on at the same time).

Further, the diodes D10, D11, D15 and D16 and the condensers C10, C11, C14 and C15 connected between the oscillation coil L2 and the bulbs BULB1 and BULB2 offsets a surge voltage occurring when the lamp is connected to the socket, whereby flickering of the lamp is removed.

Meanwhile, the anti-overheating unit 900 serves to instantly amplify the voltage and current when the lamp is turned on, using the inductance L5 and the condenser C20, to bypass the voltage and current to the rear stage.

In other words, one of the problems encountered in the electronic ballast is overheating. In the present invention, the voltage and current are instantly amplified when the lamp is turned on and then bypassed, using the inductance L5 and the condenser C20 provided in the anti-overheating unit 900. Heat occurring in the bulb is thus prevented. In other words, the anti-overheating unit 900 serves to emit generating heat.

As described above, the switching transistor (Tr) is replaced with the field effect transistor (FET), and the lamp power and the circuit driving power are divided. Therefore, the present invention has a new effect that it can provide an electronic ballast of a high power factor for a compact fluorescent lamp.

Further, the present invention has a new effect that it can selectively turn on a plurality of lamps using single electronic ballast circuit.

Also, the present invention has a new effect that it can prevent in advance damage of the circuit due to overheating since heat occurred in the electronic ballast is emitted through the anti-overheating unit.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed are:

1. An electronic ballast having a photocell circuit unit (100), a DC transformation unit (200) and a CF lamp driving circuit unit (400), being characterized in that the CF lamp driving circuit unit (400) comprises:

a voltage divider (401) for dividing power supplied from the DC transformation unit (200) into a lamp power and a circuit driving power;

field effect transistors Q1 and Q2 for controlling a voltage of the circuit driving power supplied from the voltage divider (401) to provide a voltage for high frequency oscillation;

a resistor (R12) and diodes (D7, D8, and D9) provided at a front stage of the field effect transistors (Q1 and Q2) for preventing a voltage higher than a predetermined voltage from being applied to the field effect transistors (Q1 and Q2);

a triac (TA2) for preventing line surge from being applied to gates of the field effect transistors (Q1 and Q2);

Zenor diodes (D12 and D13) for making the voltage through the field effect transistors (Q1 and Q2) a constant voltage;

a plurality of oscillation coils (L3~L5) that oscillate at high frequency according to the constant voltage produced by the Zener diodes (D12 and D13) to generate a high frequency;

a lamp for receiving the high frequency generated by the oscillation coils (L3 and L4) through a choke coil (CT) to turn on the lamp; and diodes (D14 and D15) and condensers (C10 and C11) connected to one side of the lamp for supressing a surge voltage when the lamp is connected to a socket in order to protect the lamp and the socket.

2. The electronic ballast claimed in claim 1, wherein the voltage divider (401) comprises a first diode (D5) and a first condenser (C6) connected to the output terminal of the DC transformation unit (200) for supplying the circuit driving power, and a second diode (D6) and a second condenser (C8) connected to the output terminal of the DC transformation unit (200) for preventing the lamp power from being introduced to the driving circuit side.

3. An electronic ballast having a power supply (601), a power supply unit (610), and a DC transformation and boosting unit (700), being characterized by:

a lamp driving unit (800) that oscillates according to a power supplied from the DC transformation and boosting unit (700) to selectively turn on a plurality of lamps; and anti-overheating unit (900) for instantly bypassing a high voltage when the plurality of lamps are turned on by said lamp driving unit 800 in order to prevent overheating.

4. The electronic ballast claimed in claim 3, wherein the lamp driving unit (800) comprises:

field effect transistors (T1 and T2) for controlling a voltage supplied from the DC transformation and boosting unit (700) to supply the voltage for high frequency oscillation;

resistors (R11 and R12) and diodes (D5~D7) provided at a front stage of the field effect transistors (T1 and T2), for preventing a voltage higher than a predetermined voltage from being applied to the field effect transistors (T1 and T2);

Zener diodes (ZD1 and ZD2) for making the voltage through the field effect transistors (T1 and T2) a constant voltage;

a plurality of oscillation coils (L1~L3) that oscillate at high frequency according to the constant voltage from the Zener diodes (ZD1 and ZD2) to generate a high frequency;

said plurality of lamps using the high frequency from the oscillation coils (L1~L2) through choke coils (CT1 and CT2) to selectively turn on plurality of lamps (fluorescent lamp, CF lamp, etc.); and a plurality of diodes (D10, D11, D15 and D16) and condensers (C11, C12, C14 and C15), which are connected between the oscillation coil (L2) and the plurality of the lamps (BULB1 and BULB2), for offsetting a surge voltage occurring when the lamps are connected to a respective socket in order to protect the lamps and the respective socket.

5. The electronic ballast claimed in claim 3, wherein the anti-overheating unit (900) comprises an inductance (L5) and a condenser (C20) that instantly amplify the voltage and current to bypass a voltage and current to a rear stage, when the lamps are turned on.

* * * * *